United States Patent [19]
Gallagher

[11] Patent Number: 5,833,245
[45] Date of Patent: Nov. 10, 1998

[54] ELASTOMER RING SEAL FOR PRESSURIZED FLUIDS

[76] Inventor: Stephen F. Gallagher, 100 New State Hwy., Raynham, Mass. 02767

[21] Appl. No.: 858,406

[22] Filed: May 19, 1997

[51] Int. Cl.$^6$ ........................................................ F16J 15/32
[52] U.S. Cl. ............................ 277/549; 277/438; 277/562
[58] Field of Search .................................... 277/549, 560, 277/562, 565, 566, 438, 491, 530; D23/269; 285/910

[56] References Cited

U.S. PATENT DOCUMENTS

| | | | |
|---|---|---|---|
| 3,653,670 | 4/1972 | Sifri et al. | 277/438 |
| 4,111,441 | 9/1978 | Sick et al. | 277/566 |
| 4,417,503 | 11/1983 | Izumi | 277/560 X |
| 5,265,890 | 11/1993 | Balsells | 277/562 X |
| 5,269,537 | 12/1993 | Kiesel | 277/565 X |

*Primary Examiner*—Eric K. Nicholson
*Assistant Examiner*—Greg Binda

[57] ABSTRACT

An elastomer ring seal for pressurized fluids that is particularly suited for preventing unidirectional fluid flow between outer and inner cylindrical surfaces of two or more mating members, which resists permanent deformation, and is highly leak resistant.

The ring seal has an annular body with a central longitudinal axis and an irregular polygonal profile in right cross section comprising a solid base portion at its back axial end, concentric outer and inner asymmetrical independent arm members axially extending from said base portion to its front axial end. The arm members are set apart from each other by a deep annular depression which forms opposing radial walls of said arm members.

The outer arm, configured to resist compression strain, includes; an outermost radial sealing portion near midpoint along the arm length; and includes a supporting narrow section toward the base portion, forming a thin flexible conical band around the ring seal outer side.

The inner arm, configured to resist expansion strain, includes; an innermost radial sealing portion at midpoint along the arm length; and includes a supporting long tapering section with a thin locus at the base portion, forming a flexible circular hinge-like joint around the ring seal inner side.

Outer and inner arm members include flexible elements toward the front axial end, which provide means to retain elastic potential energy, thereby contributing additional resilient support for each arm member under strain. The flexible elements include angular surfaces which form lead-in bevels providing damage resistant ease of assembly of mating members.

6 Claims, 7 Drawing Sheets

ELASTOMER RING SEAL FOR PRESSURIZED FLUIDS

BACKGROUND OF THE INVENTION

The present invention relates to elastic ring-like packing or seals, seated in an annular cavity, for preventing unidirectional fluid flow between cylindrical surfaces of two or more mating members, and specifically to a ring seal having a unique geometry, that is substantially leak resistant, providing means therein to retain potential energy when compressed externally and expanded internally by its confinement in an annular gland cavity formed between mating members, further, a ring seal that provides for ease of assembly of such members, and that is resistant to surface damage during such assembly.

Prior art seals in this category commonly have annular bodies of uniform cross section circularly extending around their bodies, with concentric innermost and outermost radially sealing portions defining their radial sectional thickness. Typically the seal radial section is larger than the gland cavity depth formed between the mating members, such a gland has opposing cylindrical surfaces and end walls forming an annular cavity. The seal is compressed, confined within the gland, and the resulting elastic potential energy along the sealing portions of the seal, exerts a force on the gland cylindrical surfaces. The sealing portions are continuous unbroken circular lines or areas of contact between the relatively soft elastic seal and the gland surfaces. The compressed seal becomes a barrier to fluids that would flow though a clearance gap separating the mating members from each other. The ideal seal will tolerate a wide range of variations in working temperature, fluid, pressure, and dynamic conditions.

The most common type of prior art seal is a molded elastomer O-ring of solid round or lobed cross section. They are inexpensive, seal in both directions, and give satisfactory performance for static, reciprocating, slow oscillating and rotational applications at fluid pressures up to 1,500 pounds per square inch. However due to current commercial demands for higher levels of reliability, longer service life, and smaller spaces available into which seals are to be installed, the use of a common O-ring may compromise product performance. O-rings are easily damaged by member sharp corners during engagement, thus, ideally, sharp corners should be chamfered and have a generous lead-in beveled edge in order to prevent such seal damage as nicks, cuts or tears which would cause fluid leakage, and beveled edges reduce the engagement insertion force necessary to compress the seal between the mating members.

Another disadvantage of common O-rings is that the mold separation line or flash is located along the sealing portions and constitutes an imperfection that breaks the sealing line and provides a passageway for fluid to leak, causing premature product failure and the necessity to replace the defective O-ring.

The second most common type of prior art seal is a U-ring or lip seal, of open hollow cross section, that seals in one direction and is most commonly used in dynamic pneumatic and hydraulic applications, at fluid pressures up to 1,500 pounds per square inch. A U-ring lip seal compressed within a gland has elastic potential energy that exerts forces at the innermost and outermost radial sealing portions of the lips on the gland cylindrical surfaces, thus providing sealing contact at zero fluid pressure. Higher fluid pressures expand the seal lips against the gland surfaces thereby increasing the sealing contact load.

A problem of such U-ring lip seals arises from a condition known as permanent deformation "set", wherein a loss of lip sealing contact occurs after the U-ring has been confined in a gland for a period of time. This "set" allows fluid at low pressure to leak past the U-ring seal. Sealing contact can be restored by means of increased fluid pressure, causing the sealing lips to expand against the gland, however this can only be done a limited number of times before the seal becomes ineffective and must be replaced.

The present invention recognizes that "set" may be due to several factors, one of which is that the compression strain on the seal has exceeded the elastic limit of the seal material thereby reducing the elastic potential energy present within the U-ring that initially forced the lip portions against the gland surfaces. The present invention also recognizes that the typical U-ring geometry tends to focus the compressed elastic potential energy on the lip portions farthest ends, thus maximum strain is on the least supported portion of the ring seal body, causing permanent deformation of the U-ring, and reducing the ability of the seal to return to its original form after being compressed within a gland cavity.

A further disadvantage of both O-ring and U-ring seals is that a cone shaped loading tube is required in many applications in order to lead in and compress the seal prior to the insertion of one member into the mating member; such a tube is needed to protect the seal against damage by sharp edges and corners that could cut or nick the sealing portions, thus allowing fluid to leak past the seal.

Accordingly a need has arisen for an improved elastomer ring seal which resists permanent deformation, which retains elastic potential energy to thus remain highly leak resistant, and which provides greater resistance to assembly damage than heretofore provided by prior art ring seals.

SUMMARY OF THE INVENTION

It is an object of the present invention to provide an improved leak resistant elastomer ring seal particularly suited for preventing unidirectional fluid flow between cylindrical surfaces of two or more mating members.

It is another object of the present invention to provide an improved leak resistant, and damage resistant elastomer ring seal particularly suited for preventing unidirectional fluid flow between cylindrical surfaces of two or more mating members.

It is a further object of the present invention to provide an improved leak resistant, damage resistant elastomer ring seal that resists permanent deformation "set", suited for preventing unidirectional fluid flow between cylindrical surfaces of two or more mating members.

The present invention relates to a radial seal in the form of a ring-like structure of elastomeric material such as nitrile rubber, configured to be confined within a gland formed around cooperating cylindrical surfaces of two or more mating members. Such a gland has outer and inner opposing cylindrical surfaces with end walls forming an annular cavity between the mating members. The elastomer ring seal comprising; a ring-like annular body with a central longitudinal axis and an irregular polygonal profile in right cross section, including front and back axial ends parallel to each other and perpendicular to said axis, the distance between the axial ends defining the ring seal width. The front end includes a deep annular depression which forms an opening with adjacent flat surfaces, the depression axially extends toward the back end and terminates at a lesser distance than the ring seal width, thus forming a solid base portion adjacent to the back end. The depression also forms walls of asymmetrical flexible outer and inner circularly extending concentric arm members, projecting from the base portion and axially extending to the front end. The outer arm includes an outermost radial portion located axially near midpoint along its length defining the outside sealing portion that forms the outside diameter of the ring seal. The inner arm includes an innermost radial portion located axially at midpoint along its length defining the inside sealing portion that forms the inside diameter of the ring seal. The arm members are dissimilar in right cross sectional profile, whereas the outer arm member is configured to resist compression strain, and the inner arm is configured to resist expansion strain.

The outer arm has a narrow section of uniform thickness, extending from the solid base portion toward the outside sealing portion, the narrow section forms a flexible band easily bent radially inward as the outer sealing portion is compressed within a gland, thereby reducing strain on the base portion that would contribute to seal compression "set". The outer arm includes a short tapering section having its thickest most rigid radial portion through the outer sealing portion perpendicular to the axis, said tapering section decreasing in thickness until it joins the narrow section. The outside sealing portion has front and back inclined lateral surfaces that taper inward with respect to the axis, said front surface extends and terminates at the front end, said back surface extends and terminates at the narrow section, thereby forming conical sides which provide outer lead-in bevels.

The outer lead-in bevels allow the ring seal to be inserted easily into a member bore when the gland outer surface constitutes a bore wall in a mating member, thus avoiding possible damage to the seal by sharp corners at the bore end.

The inner arm has continually changing thicknesses along its length specifically proportioned to resist "set" due to expansion when the inner sealing portion is stretched taut within a gland, and to retain elastic potential energy present within the inner arm. The inner arm includes a long tapering section having its thickest most rigid radial portion through the inner sealing portion perpendicular to the axis, said tapering section decreasing in thickness to its thinnest most flexible point joining the base portion. The inside sealing portion has front and back inclined lateral surfaces that taper outward with respect to the central axis, said front surface extending and terminating at the front end, and said back surface extending and terminating at the solid base portion, thereby forming conical sides which provide inner lead-in bevels of the seal. The inner lead-in bevels allow a member cylindrical surface to be inserted easily through the ring seal when the gland inner surface constitutes a cylindrical portion of a mating member or shaft, thus avoiding possible damage to the seal by a sharp end of said shaft, thereby providing a ring seal that is resistant to damage during mating member assembly.

Outer and inner arm members include flexible elements that comprise an area extending from the front end to each sealing portion, and between the front lateral surfaces and the walls within the annular depression. Said elements retain elastic potential energy when strained as the seal is compressed inwardly and stretched outwardly by confinement in a gland cavity. The elements flex, applying an opposing pressure urging the arm members to rebound, thereby providing resistance to deformation as said elements seek to regain their original form.

The ring seal is unidirectional and must be oriented within the gland, having the open front end facing the source of fluid pressure, and the back end facing the gland end wall opposite the source of pressure. The seal installed within the gland cavity between mating members will have tight contact of the outside sealing portion to the outer gland surface and of the inside sealing portion to the inner gland surface, the width of the ring seal being less than the space between the gland cavity end walls. Introducing pressurized fluid within the gland tends to exert a force on the ring seal, urging it to move toward the gland end wall opposite the source of fluid pressure, whereupon the back end will abut that gland end wall in tight contact. As fluid pressure increases, the pressure acts within the annular depression to expand the arm members against the gland cylindrical surfaces, thus assisting the elastic potential energy of the seal by increasing the sealing contact load on the mating members. The arm members respond independently to possible relative motion of the mating members, each arm following its respective gland surface, maintaining sealing contact irrespective of relative axial, radial, or angular motion of the mating members, thus providing a highly leak resistant elastomer ring seal for pressurized fluids.

Other objects and advantages of the invention will become apparent from the following detailed description of the invention taken in conjunction with the accompanying drawings.

DETAILED DESCRIPTION OF THE PREFERRED EMBODIMENT

Figure 1:
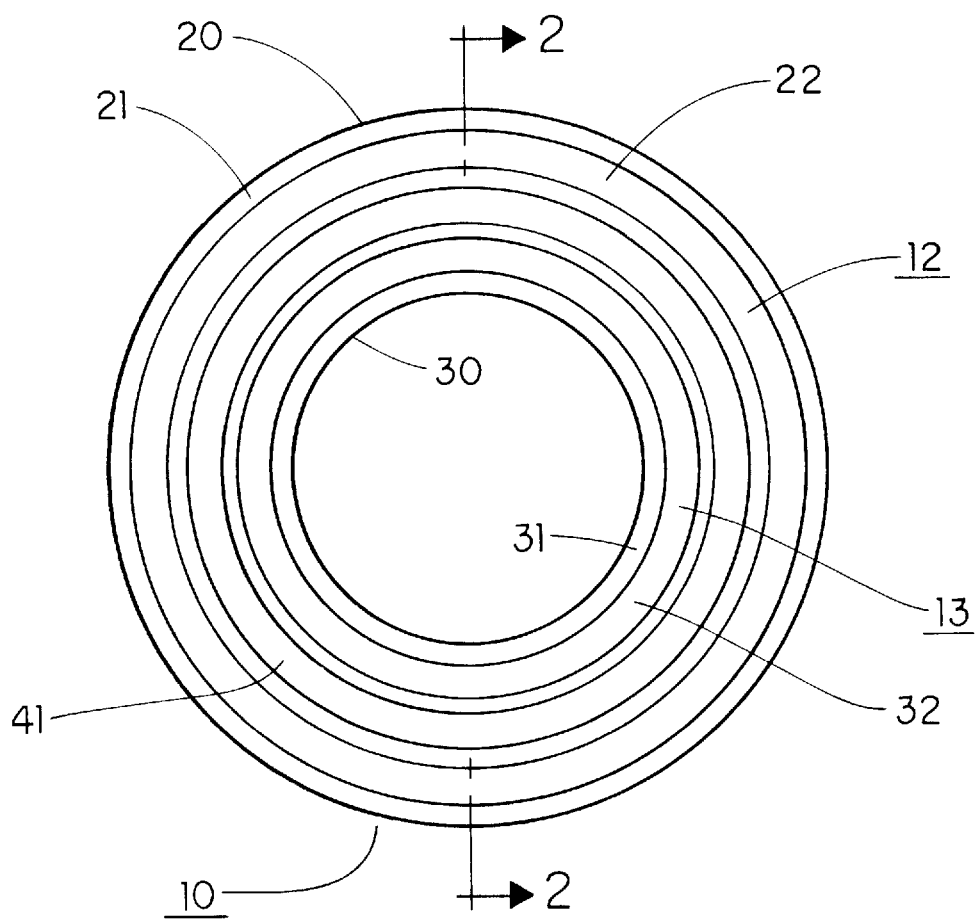
FIG. 1 is an end view of a ring seal embodying the invention.
Figure 2:
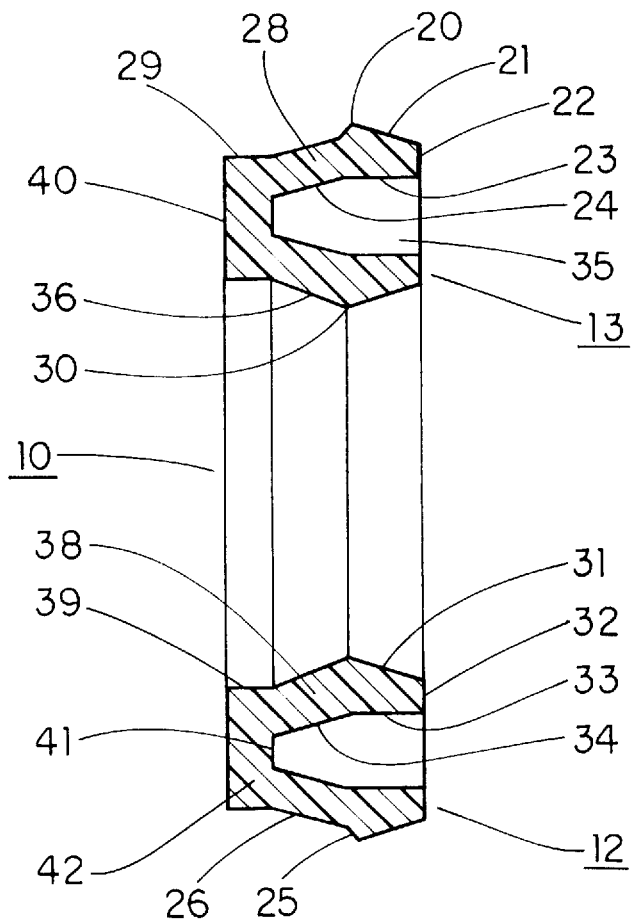
FIG. 2 is a half sectional view of the ring seal in right profile along the cutting plane line 2—2 as shown in FIG. 1.

Referring to FIG. 1, there is illustrated a front end view of elastomer ring seal 10 having an annular body in accordance with the present invention comprising; a series of radial portions concentric to a central longitudinal axis, and connected at one axial end by a solid base portion, thereby forming outer and inner arm members set apart by an annular depression therein, the bottom of which is surface 41, shown more clearly in FIG. 2. Outer arm member 12 has an outermost radial sealing portion 20 defining the outside diameter of ring seal 10, and inner arm member 13 has an innermost radial sealing portion 30 defining the inside diameter of ring seal 10. Surfaces 22 and 32 are flat and perpendicular to said axis, defining the front end of ring seal 10. Lateral surfaces 21 and 31 form lead-in bevels toward the front end of ring seal 10, whereas lateral surface 21 inclines radially inward from sealing portion 20 joining end surface 22, and lateral surface 31 inclines radially outward from sealing portion 30 joining end surface 32.

As may be seen in FIG. 2, ring seal 10 has an irregular polygonal profile in right cross section having front and back ends perpendicular to the central longitudinal axis, front end surfaces 22, 32, are parallel to back end flat surface 40, the distance between said ends defining the width of ring seal 10. Arm members 12 and 13 are concentric, asymmetrical, and flexible, axially extending from base portion 42 to front end surfaces 22 and 32 respectively. Outer arm 12 has an outermost radial sealing portion 20 located along said axis near midpoint of its length, said arm includes lateral surfaces 21, 25, and adjoining surface 26 all of which incline inward with respect to said axis, thereby forming outermost conical sides of ring seal 10. Inner arm 13 has an innermost radial sealing portion 30 located along said axis at midpoint of its length, said arm includes lateral surfaces 31 and 36 both of which incline radially outward with respect to said axis, thereby forming innermost conical sides of ring seal 10. Said ring seal includes a deep annular depression 35 between arm members 12 and 13, said depression axially extending from front ends 22 and 32 toward back end 40, terminating at bottom 41; and a base portion 42 comprising an area extending radially from cylindrical surface 29 to cylindrical surface 39, both being parallel to said axis, and extending axially from back end 40 to depression bottom 41, said base portion connecting arm members 12 and 13.

Depression 35 forms cylindrical wall 23 of outer arm 12, said wall axially extending from front end 22 to an end point beyond the location of sealing portion 20; and forms conical wall 24 angularly extending from said end point of wall 23 radially inward with respect to said axis to bottom 41, thus forming an inner conical surface of outer arm narrow section 28. Depression 35 also forms cylindrical wall 33 of inner arm 13, said wall axially extending from front end 32 to an end point in line with the location of sealing portion 30; and forms conical wall 34 angularly extending from said end point of wall 33 radially outward with respect to said axis to bottom 41, thus forming an outer conical surface of inner arm tapering section 38.

Figure 3:
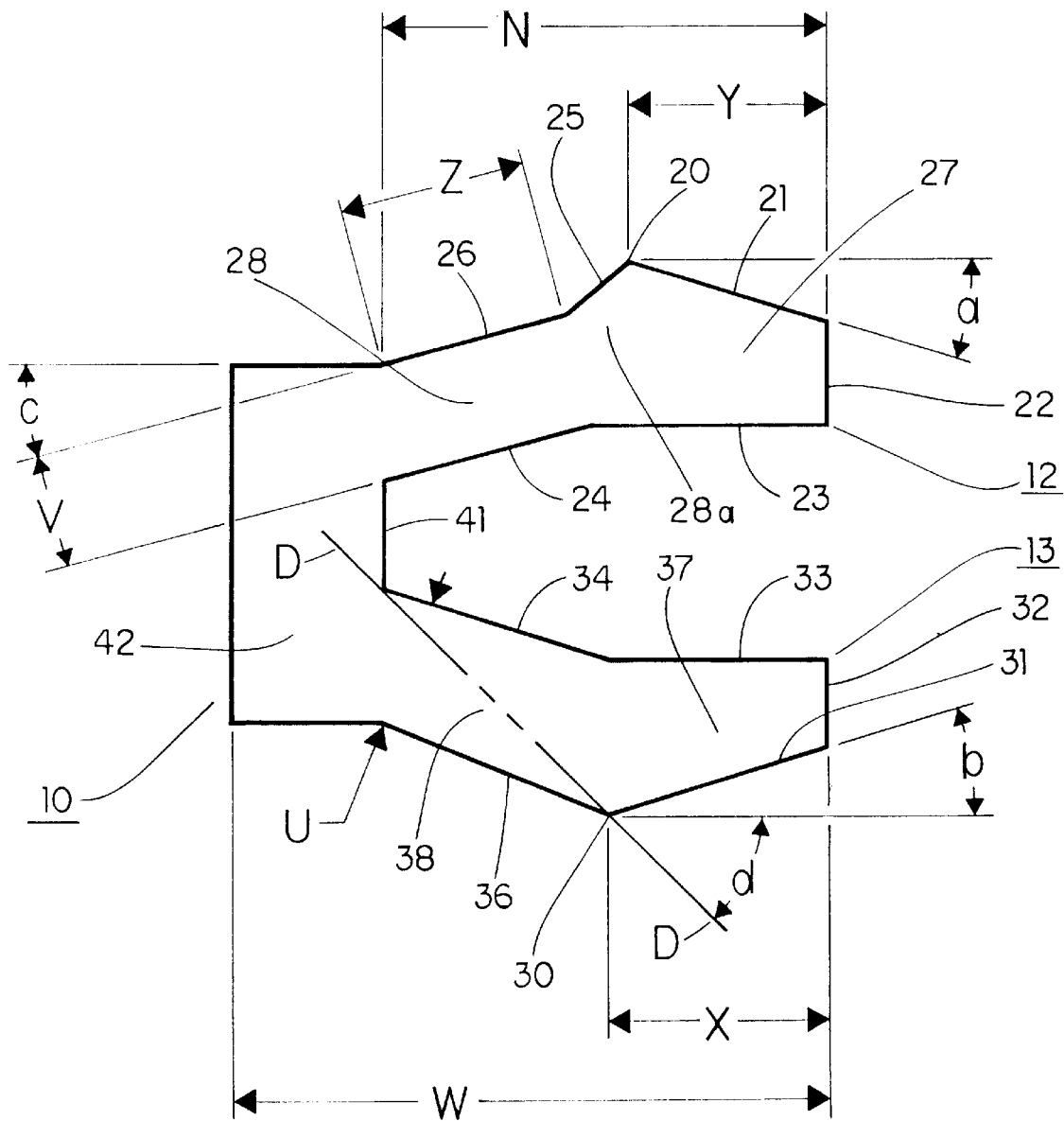
FIG. 3 is a schematic diagram showing details of the seal cross section in right profile.

Referring to FIG. 3, there is illustrated a schematic diagram showing details of the cross section of ring seal 10 in right profile. Asymmetrical arm members 12 and 13 are specifically configured to certain proportional relationships in order to reduce undesirable strain and to maintain sufficient sealing contact when outer sealing portion 20 is compressed, and inner sealing portion 30 is conversely expanded within a gland cavity formed between outer and inner cylindrical surfaces of mating members. In the diagram, W represents a desired width of a ring seal in accordance with the present invention. Therefore, outer arm 12 and inner arm 13 shall have lengths along the central axis indicated by N which is equal to not more than 75% of width W; then inner sealing portion 30 is located from front end 32 a distance along the central axis indicated by X, and outer sealing portion 20 is located from front end 22 a distance along the central axis indicated by Y, and inner arm tapering section 38 has a flexure locus having a thickness indicated by U, and the distance between wall 24 and adjoining surface 26 forms parallel narrow section 28 of thickness indicated by V, and section 28 has a length indicated by Z. In terms of N, the governing relationships of the present invention are as follows:

| Length or distance: | |
|---|---|
| X equals 50% of N | Angle b equals 17 degrees, preferred |
| Y equals 45% of N | Angle a equals 17 degrees, preferred |
| Z equals 42% of N | |
| Thickness of section: | |
| U equals 28% of N | Angle d equals 45 degrees |
| V equals 25% of N | Angle c equals 15 degrees |

These values are preferred, however slight variations are possible without loss of ring seal desired characteristics. The attained geometry of outer arm 12 is such that; adjoining surface 26 extends at angle c along arm 12, joining lead-in lateral surface 25. Surface 26 extends a distance Z parallel and close to conical wall 24, so as to form narrow section 28 of thickness V. Narrow section 28 forms a thin uniform conical band, circularly extending around the outer body of ring seal 10; said section has the ability to flex easily and become a curved band in tension providing resilient support of outer sealing portion 20 when it is compressed within a gland outer cylindrical surface of smaller diameter, thereby reducing undesirable strain tending to deform base portion 42 which would contribute to permanent seal deformation. Lateral surface 25 inclines from outer sealing portion 20 and extends radially inward with respect to said axis, to adjoining surface 26. The relative distance between surface 25 and cylindrical wall 23 is such to form short tapering section 28a having its thickest most rigid radial portion perpendicular to said axis, from sealing portion 20 to wall 23. Tapering section 28a gradually decreases in thickness and rigidity until it joins more flexible narrow section 28. Outer arm 12 includes flexible element 27 that provides additional support during compression of sealing portion 20, said element comprising an area extending axially from front end 22 to sealing portion 20 and extending radially from lateral surface 21 to wall 23.

Permanent deformation of outer arm 12 is resisted as element 27 energetically seeks to regain its original form, said element retaining elastic potential energy of compression urging arm 12 radially outward against said gland surface, therefore, element 27 contributes to the elastic potential energy available to urge outer arm 12 to return to its original form and dimension when ring seal 10 is compressed within said gland outer cylindrical surface.

Continually changing thicknesses along the length of inner arm 13, form a series of tapering innermost conical sections of ring seal 10. With respect to the central axis, the angle of inclination of conical wall 34 is less than that of lateral surface 36, so as to form long tapering section 38 having its thickest most rigid radial portion perpendicular to said axis, from sealing portion 30 to wall 33. Tapering section 38 gradually decreases in thickness and rigidity until it reaches its thinnest and most flexible point as indicated by locus U, joining inner arm section 38 to base portion 42. Inner sealing portion 30 is located so that an angular plane D—D at 45 degrees to said axis passes through sealing portion 30 and the junction point of wall 34 and bottom 41, thereby allowing conical wall 34 and lateral surface 36 to bend radially outward, becoming curved surfaces in tension when inner sealing portion 30 is expanded onto a gland inner cylindrical surface of larger diameter. These differences in arm members provide inner arm 13 with resilient support and strength to resist expansion as sealing portion 30 is stretched, and provide a flexible hinge-like joint at locus U in order to allow said expansion without permanently deforming base portion 42.

Inner arm 13 includes flexible element 37 that provides additional support during the expansion of inner sealing portion 30 when it is stretched onto said gland surface, said element comprising an area extending axially from front end 32 to sealing portion 30 and extending radially from lateral surface 31 to wall 33. Permanent deformation of inner arm 13 is resisted as element 37 energetically seeks to regain its original form, said element retaining elastic potential energy of expansion urging arm 13 radially inward against said gland surface, therefore, element 37 contributes to the elastic potential energy available to urge inner arm 13 to return to its original form and dimension when ring seal 10 is expanded onto said gland inner cylindrical surface.

Figure 4:
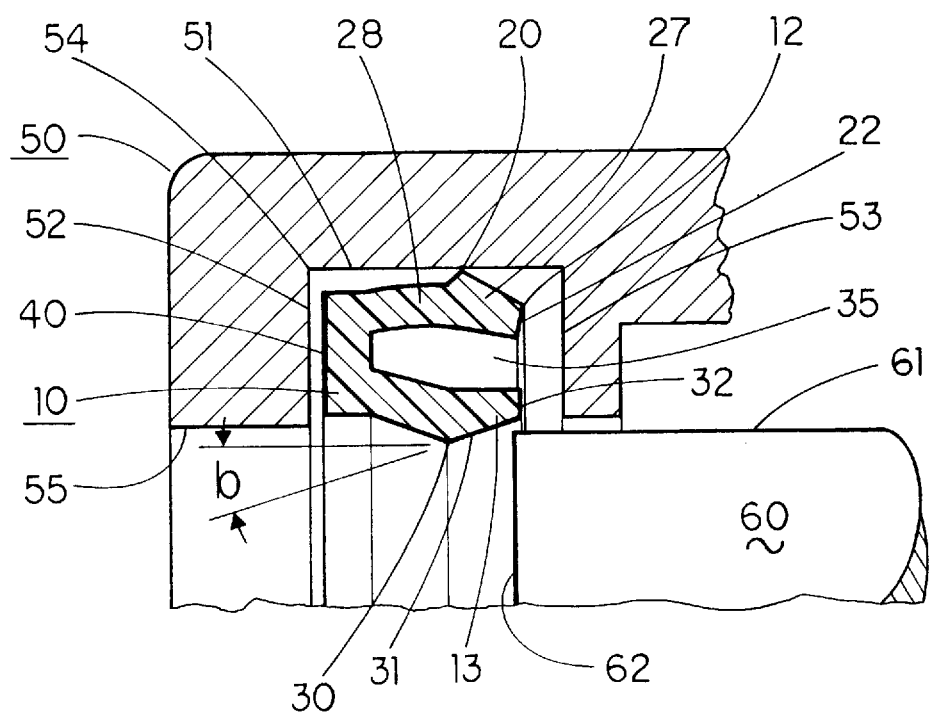
FIG. 4 is a fragmental cross sectional view showing the ring seal of FIG. 1 installed in a cylindrical recess within a housing member bore during engagement of a mating external circular member.

Referring to FIG. 4, there is illustrated a fragmental view showing the ring seal of FIG. 1 installed in a cylindrical recess or groove 54 in the wall of bore 55 within a housing member 50, during engagement of a mating external circular member or shaft 60. Recess cylindrical surface 51 is smaller in diameter than was the originally molded outside diameter of ring seal 10, therefore sealing portion 20 is compressed causing outer arm 12 to deform and compact into depression 35, bending narrow section 28 so as to form an inward curved band and causing element 27 to flex radially inward. Compressed outer sealing portion 20 is in sealing contact with recess surface 51, while ring seal front ends 22, 32, and back end 40 loosely contact recess end walls 52 and 53.

Element 27 retains spring-like energy due to sealing portion 20 being compressed, applying an opposing pressure of outer arm 12 urging sealing portion 20 radially outward against recess surface 51, thereby providing additional elastic energy to maintain sealing contact of the outside diameter of ring seal 10 to housing member 50. Inner arm lateral surface 31 forms a lead-in angle of entry "b", for ease of insertion of the approaching mating member end 62. Angle "b" is in the range of 10 to 25 degrees with respect to said axis, the preferred angle being 17 degrees. The molded inside diameter of ring seal 10 formed by inner sealing portion 30, is smaller than the diameter of a mating inserted cylindrical surface 61, therefore sealing portion 30 will become stretched radially outward, and onto surface 61 as member end 62 enters bore 55, proceeding through ring seal 10, and continuing beyond recess surface 51 and end wall 52, thereby completing a gland cavity between mating members. Subsequently, inner sealing portion 30 will be in sealing contact with external cylindrical surface 61, in the same manner as described below in FIG. 6, wherein, inner arm 13 is expanded with sealing portion 30 in sealing contact with a circular shaft member 64.

Figure 5:
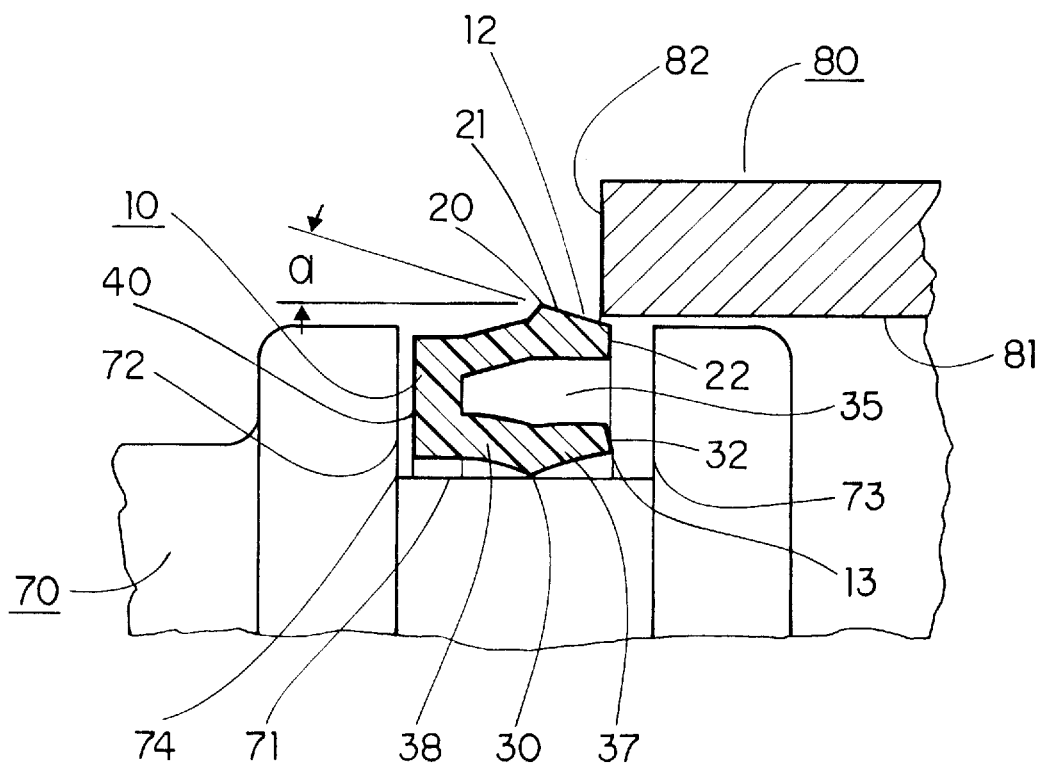
FIG. 5 is a similar fragmental cross sectional view showing the ring seal of FIG. 1 installed in a cylindrical recess within an external circular member during engagement into a mating tubular member bore.

FIG. 5 is a similar fragmental view showing the ring seal of FIG. 1 installed in a cylindrical recess or groove 74 in an external circular member or piston 70, during engagement into an internal cylindrical surface or bore 81 within a mating tubular member 80. Recess cylindrical surface 71 is larger in diameter than was the originally molded inside diameter of seal body 10, therefore inner sealing portion 30 is stretched causing inner arm 13 to deform and expand into depression 35, bending tapering section 38 so as to form an outward curved section in tension, and flexing element 37 radially outward. Stretched inner seal portion 30 is in sealing contact with recess surface 71, while seal front ends 22, 32, and back end 40 loosely contact recess end walls 72 and 73. Element 37 retains spring-like energy due to sealing portion 30 being stretched, applying an opposing pressure of inner arm 13 urging sealing portion 30 radially inward against recessed surface 71, thereby providing additional elastic energy to maintain sealing contact of the inside diameter of ring seal 10, to said piston member 70.

Outer arm lateral surface 21 forms a lead-in angle of entry "a" for ease of inserting ring seal 10 into said bore 81. Angle "a" is in the range of 10 to 25 degrees with respect to the central axis, the preferred angle being 17 degrees. The molded outside diameter of ring seal 10 formed by outer sealing portion 20 is larger than the diameter of said bore 81, therefore sealing portion 20 will become compressed radially inward when inserted into said bore 81. In this view, said piston member 70 with installed ring seal 10 is being inserted into said bore 81, continuing so that recess surface 71 and end wall 72 pass beyond bore end 82, thereby completing a gland cavity between mating members. Subsequently, outer sealing portion 20 will be in sealing contact with housing bore 81, in the same manner as described below in FIG. 7, wherein, outer arm 12 is deformed with sealing portion 20 in sealing contact with an internal cylindrical surface or bore 84.

Figure 6:
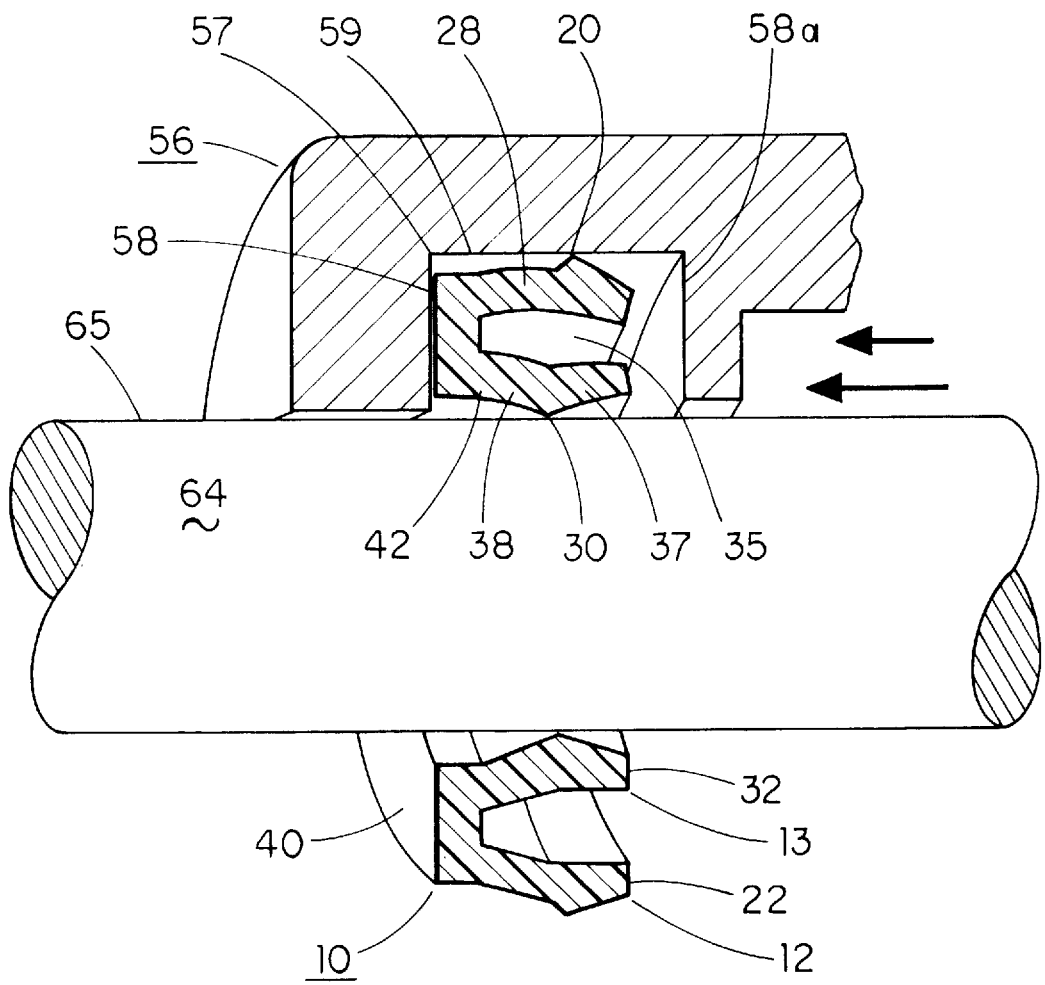
FIG. 6 is a perspective fragmental view showing the ring seal of FIG. 4 installed in a cylindrical recess within a housing member bore, engaged by a mating circular shaft-like member.

Referring to FIG. 6 there is illustrated a perspective fragmental view showing the ring seal of FIG. 4 installed in a cylindrical recess or groove 57 within a housing member 56, and fully engaged by a mating external circular member or shaft 64. Ring seal 10 is in sealing contact with mating members 56 and 64. Arm members 12 and 13 are deformed into depression 35 thereby acquiring elastic potential energy in order to maintain sealing contact between ring seal 10 and mating members 56 and 64. Front ends 22, 32, and back end 40 loosely contact end walls 58a and 58 respectively. Outer arm 12 is deformed radially inward by compression of sealing portion 20, and exerts an opposing pressure urging sealing portion 20 against cylindrical surface 59. Inner arm 13 is deformed radially outward by the stretching of sealing portion 30 and exerts an opposing pressure urging sealing portion 30 against external circular surface 65. Inner arm tapering section 38 bends at base portion 42 forming a curved section in tension providing resilient support of said thickest radial portion through sealing portion 30, and element 37 flexes radially outward and retains spring-like energy due to sealing portion 30 being stretched, applying an opposing pressure of inner arm 13 urging sealing portion 30 radially inward against said surface 65, thereby providing additional elastic energy in order to maintain sealing contact of the inside diameter of ring seal 10 to external circular shaft member 64.

Ring seal 10 is unidirectional and intended to provide sealing of fluid pressure in one direction only, and does not provide an effective seal if pressure is applied from the direction of back end 40. Pressurized fluid between housing 56 and shaft 64 flowing from the direction as indicated by arrows, applies a force to ring seal 10 causing it to move in a direction opposite the source of pressure so that back end 40 abuts recess end wall 58 in tight contact. As fluid pressure increases within depression 35, outer arm narrow section 28 is urged radially outward applying additional pressure at sealing portion 20 against recess surface 59, and inner arm tapering section 38 is urged radially inward applying additional pressure at sealing portion 30 against shaft surface 65, thereby increasing the sealing effectiveness of ring seal 10, between mating members 56 and 64.

Figure 7:
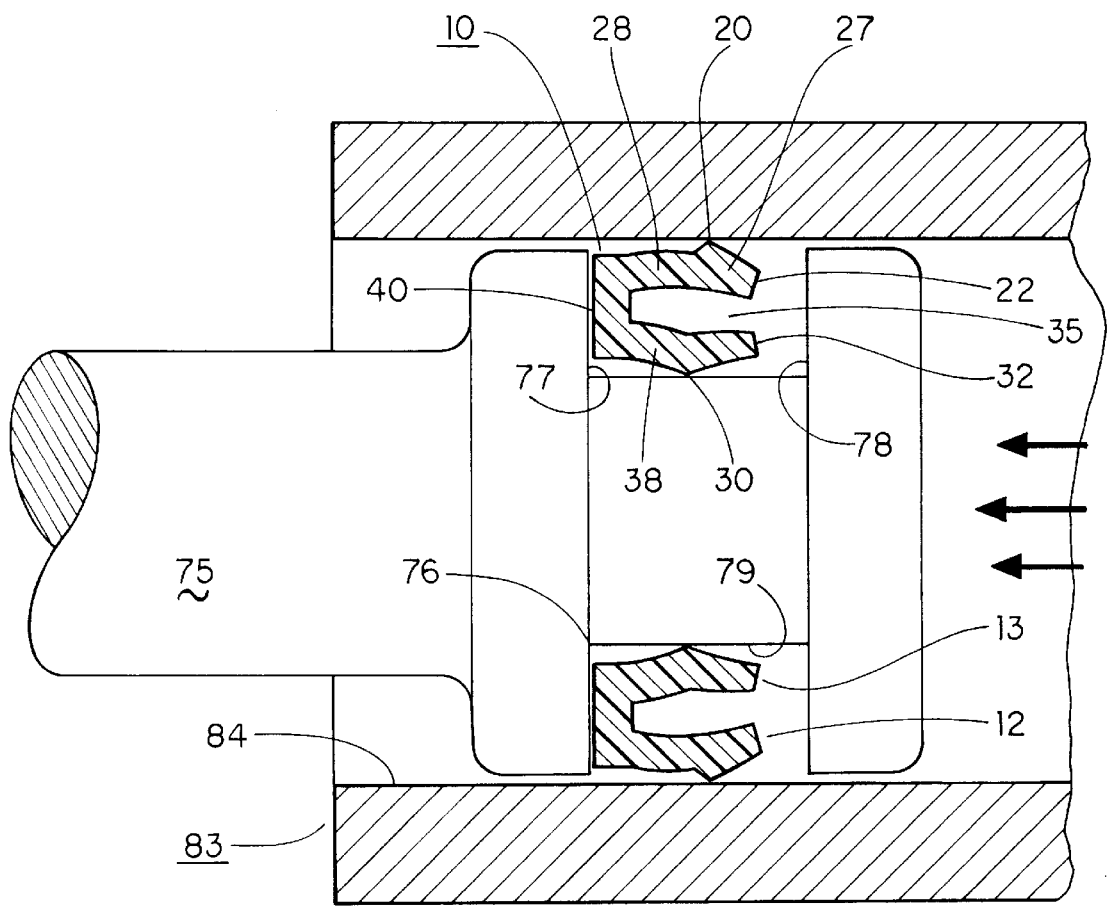
FIG. 7 is a sectional view showing the ring seal of FIG. 5 confined within a gland cavity formed between a tubular member bore and a recess within a mating circular piston-like member.

As may be seen, FIG. 7 is a fragmental sectional view of the ring seal of FIG. 5 confined within a gland cavity formed between an internal cylindrical surface or bore 84 of a tubular housing member 83, and an external cylindrical recess 76 within a mating external circular member or piston 75. Ring seal 10 is in sealing contact with mating members 75 and 83. Arm members 12 and 13 are deformed into depression 35 thereby acquiring elastic potential energy in order to maintain sealing contact between ring seal 10 and mating members 75 and 83. Front ends 22, 32, and back end 40 loosely contact recess end walls 78 and 77 respectively. Outer arm 12 is deformed radially inward by compression of sealing portion 20, and exerts an opposing pressure urging sealing portion 20 against bore 84. Inner arm 13 is deformed radially outward by the stretching of sealing portion 30 and exerts an opposing pressure urging sealing portion 30 against recess cylindrical surface 79. Outer arm narrow section 28 is bent inward forming a curved band in tension providing resilient support of said thickest radial portion through sealing portion 20, and element 27 flexes radially inward and retains spring-like energy due to sealing portion 20 being compressed, applying an opposing pressure of outer arm 12 urging sealing portion 20 radially outward against said bore 84, thereby providing additional elastic energy to maintain sealing contact of the outside diameter of ring seal 10 to tubular housing member 83.

Pressurized fluid entering tubular member bore 84 flowing from the direction as indicated by arrows, applies a force to ring seal 10 causing it to move so that back end 40 abuts recess end wall 77 in tight contact. As fluid pressure increases within depression 35, outer arm narrow section 28 is urged radially outward applying additional pressure at sealing portion 20 against said bore 84, and inner arm tapering section 38 is urged radially inward applying additional pressure at sealing portion 30 against recess cylindrical surface 79, thereby increasing the sealing effectiveness of ring seal 10, between mating members 75 and 83.

This view more clearly illustrates the independent character of ring seal arm members 12 and 13, wherein arm 12 will conform to bore 84 of said gland independently of arm 13 which follows the relative position of piston recess surface 79 irrespective of relative axial, radial or angular motion of said mating members, thus providing a highly leak resistant elastomer ring seal for preventing unidirectional fluid flow between cylindrical surfaces of two or more mating members. Bidirectional sealing is provided by use of two opposing ring seals in separate gland cavities, oriented so that back end is facing back end.

While a preferred embodiment of the invention has been described and illustrated, it is to be understood that modifications thereof may be made within the scope of the appended claims without departing from the spirit of the invention.

What is claimed is:

1. An elastomer ring seal that is particularly suited for preventing unidirectional fluid flow between outer and inner cylindrical surfaces of two or more mating members, the ring seal comprising: a ring-like annular body of molded homogeneous material, with a central longitudinal axis and an irregular polygonal profile in right cross section, defined by; a front axial end and back axial end which are parallel to each other and perpendicular to said axis, the distance between said front and back ends defining the width of the ring seal, outer and inner radial arm members concentric to said axis and connected to each other by a solid base portion toward said back end, said arm members having lengths along said axis extending from said base portion not more than 75 percent of said ring seal width, to said front end, said arm members configured to be asymmetrical and set apart by an annular depression which forms opposing radial walls of said arm members, said depression axially extending from said front end to said base portion thereby forming an axial bottom;

said outer radial arm member comprising; an outermost radial sealing portion located near midpoint of said outer arm length defining the outside diameter of said ring seal; outer arm front and back inclined surfaces angularly extending inward with respect to said axis lateral to said outermost sealing portion, said front surface extending and terminating at the front axial end, and said outer arm back surface extending toward the back axial end; a narrow section angularly extending from the solid base portion toward said outermost sealing portion and joining a short tapering section adjacent to said outermost sealing portion, said narrow section having a length and uniform thickness thereof; a short tapering section axially extending from said outermost sealing portion to said narrow section and having its thickest most rigid radial portion perpendicular to said axis, from said outermost sealing portion to said outer arm radial wall, the short tapering section decreasing in thickness toward said narrow section; an outer arm flexible element comprised of an area extending axially from said front end to said outermost sealing portion and extending radially from the outer arm front inclined surface to said outer arm radial wall, said outer arm flexible element providing means to retain additional elastic energy to maintain sealing contact of said outer sealing portion with an internal cylindrical surface of a mating member, said outer arm front inclined surface being at an angle to said axis of about 17 degrees, thereby providing damage resistant lead-in for inserting said ring seal outside diameter into said mating member internal cylindrical surface or bore;

said inner radial arm member comprising; an innermost radial sealing portion located at midpoint of said inner arm length defining the inside diameter of said ring seal; inner arm front and back inclined surfaces angularly extending outward with respect to said axis lateral to said innermost sealing portion, said inner arm front surface extending and terminating at the front axial end, and said inner arm back surface extending and terminating at the solid base portion; a long tapering section axially extending from the solid base portion toward said innermost sealing portion, said long tapering section having its thickest most rigid radial portion perpendicular to said axis, from said innermost sealing portion to said inner arm radial wall, said long tapering section decreasing in thickness toward said base portion to its thinnest most flexible locus, thereby forming a hinge-like joint;

an inner arm flexible element comprised of an area extending axially from said front end to said innermost sealing portion and extending radially from said inner arm front inclined surface to said inner arm radial wall, said inner arm flexible element providing means to retain additional elastic energy to maintain sealing contact of said inner sealing portion with an external cylindrical surface of a mating member, said inner arm front inclined surface being at an angle to said axis of about 17 degrees, thereby providing damage resistant lead-in for inserting said mating member surface or shaft through said ring seal inside diameter.

2. An elastomer ring seal according to claim 1 wherein said outer sealing portion is located from said front end a distance along said axis of about 45 percent of said outer arm length.

3. An elastomer ring seal according to claim 1 wherein said narrow section extends at an angle to said axis of about 15 degrees, said narrow section having a length about 42 percent of said outer arm length, said narrow section having a uniform thickness about 25 percent of said outer arm length thus forming a thin conical band circularly extending around said ring seal body, said long tapering section having the ability to flex easily and become a curved band in tension providing resilient support of said outer sealing portion when it is compressed when said ring seal outside diameter is within a mating member internal cylindrical surface of smaller diameter.

4. An elastomer ring seal according to claim 1 wherein said inner sealing portion is located from said front end a distance along said axis of about 50 percent of said inner arm length.

5. An elastomer ring seal according to claim 1 wherein said long tapering section has its thinnest and most flexible locus located where said inner arm joins said base portion, said locus having a thickness about 28 percent of said inner arm length, said tapering section having the ability to flex easily at said locus, said tapering section having the ability to bend radially outward and become a curved section in tension providing resilient support of said inner sealing portion when it is expanded when a mating member external cylindrical surface of larger diameter is within said ring seal inside diameter.

6. An elastomer ring seal according to claim 1 wherein said long tapering section and said depression axial bottom join at a junction located along an angular plane 45 degrees to said axis, said plane passing through said inner sealing portion.

* * * * *